INVENTORS.
RUSSELL W. STINEMAN
JACK E. SHEARER
BY
Reynolds, Beach & Christensen
ATTORNEYS INVENTORS.
RUSSELL W. STINEMAN
JACK E. SHEARER
BY
Reynolds, Beach & Christensen
ATTORNEYS United States Patent Office 2,917,903
Patented Dec. 22, 1959

2,917,903

FUEL FEEDING AND APPARATUS COOLING SYSTEMS FOR VEHICLES

Russell W. Stineman and Jack E. Shearer, Seattle, Wash., assignors to Boeing Airplane Company, Seattle, Wash., a corporation of Delaware Application October 21, 1955, Serial No. 542,009

11 Claims. (Cl. 62—55)

This invention relates to liquid feeding and apparatus cooling systems particularly for aircraft and other vehicles, and more especially concerns improvements in systems for the feeding of fuel and for the explosion-proofing of the fuel storage facilities, and in conjunction therewith for providing a heat sink by which the fuel itself and alternatively or additionally certain apparatus may be cooled by operation of the novel system. The invention is herein illustratively described by reference to the presently preferred forms thereof applicable to aircraft; however, it will be recognized that certain modifications and changes in the disclosed embodiments may be made and that alternative embodiments may be devised within the scope of the inventive subject matter.

The added weight and energy consumption imposed by cooling apparatus, particularly in modern aircraft are material factors in determining the useful load capacity and the operating range of an aircraft. Electronic apparatus, pressure compartment ventilation systems, engines, dynamo-electric equipment and other apparatus in the aggregate impose a large cooling requirement. The conventional fuel pump and drive unit also consumes appreciable energy and requires cooling. The aggregate bulk, weight and energy consumption of adequate cooling apparatus meeting the total need become more and more serious problems as aircraft become more fully automatic, faster and more internally crowded with heat-generating equipment.

A general object of the present invention is a novel system by which, with minimum applied energy, and with minimum apparatus weight, bulk and complexity affords an efficient cooling arrangement and at the same time an effective liquid feeding and explosion-proofing facility in aircraft and other installations.

A related and more specific object is such a system for aircraft and other installations providing a versatile, reliable, safe and efficient means for feeding fuel to an engine and, coincidentally therewith, extracting heat from the fuel itself or from a separate fluid medium, such as ram air. The cooled fuel or ram air in turn may itself then be used as an effective coolant.

Another object of the invention is a novel fuel feeding and fuel tank explosion-proofing arrangement which is safe, reliable and efficient.

The invention makes use of the known concept of supplying inert gas under controlled pressure to the fuel tank in order to force the fuel therein to the engine combustion apparatus while eliminating combustible mixtures from the fuel supply system. The novel features of the invention relate to the manner and means for producing such pressurized gas in controlled manner and additionally for utilizing such producer means for useful cooling purposes, as hereinafter disclosed.

In accordance with the invention the inert gas, such as carbon dioxide, is stored in the condensed and preferably solidified state in one compartment of a heat exchanger wherein it is evaporated at a controlled rate to establish the required fuel feeding pressure. The term "condensed" is intended herein to embrace both the solid and the liquid states of the refrigerant. Such pressurized gas is then conducted to the fuel tank and forces the fuel from the tank at a rate determined by the gas pressure and any flow restrictions in the fuel line to the engine. A fluid medium, such as the engine fuel itself, warmer than the condensed inert gas, is conducted through an adjoining compartment of the heat exchanger for supplying heat of evaporation to the condensed inert gas, and the rate of flow of such heat-source fluid through the heat exchanger is automatically regulated in accordance with changes of pressure of the vaporized inert gas in order to provide the desired control over fuel supply pressure. Liquid fuel or other fluid flowing through the heat exchanger and cooled therein by its loss of heat to the condensed inert gas is then preferably passed through one or more separate heat exchange devices as a coolant therein for the cooling of selected apparatus of the aircraft or other vehicle. For example, the fuel may be passed through an engine heat exchanger before reaching the engine combustion device, or it may pass through a heat exchanger for electronic apparatus. In lieu of or additionally to utilization of the engine fuel as the fluid causing vaporization of the solidified inert gas, air entering a ram or collected by other suitable means may be passed through the first heat exchanger at a controlled rate to produce controlled evaporation of the condensed inert gas and thereafter may be passed through suitable heat exchange apparatus as a coolant therein.

It will be recognized that in the novel system feeding of fuel to the engine is accomplished without generation of heat and without application of appreciable energy required to be developed by any power supply in the aircraft itself and that the only energy required for the development of fuel pressure is that which is extracted from the fuel itself or from a different fluid, and finally that the resultant loss of heat from such fuel or other fluid is employed to advantage in the performance of one or more useful cooling functions in the aircraft without the requirement of energy-consuming, heavy or bulky cooling apparatus to perform such cooling functions as in conventional systems.

These and other features, objects and advantages of the invention together with certain details of the presently preferred embodiments thereof will become more fully evident from the following description by reference to the accompanying drawings.

Figure 1:
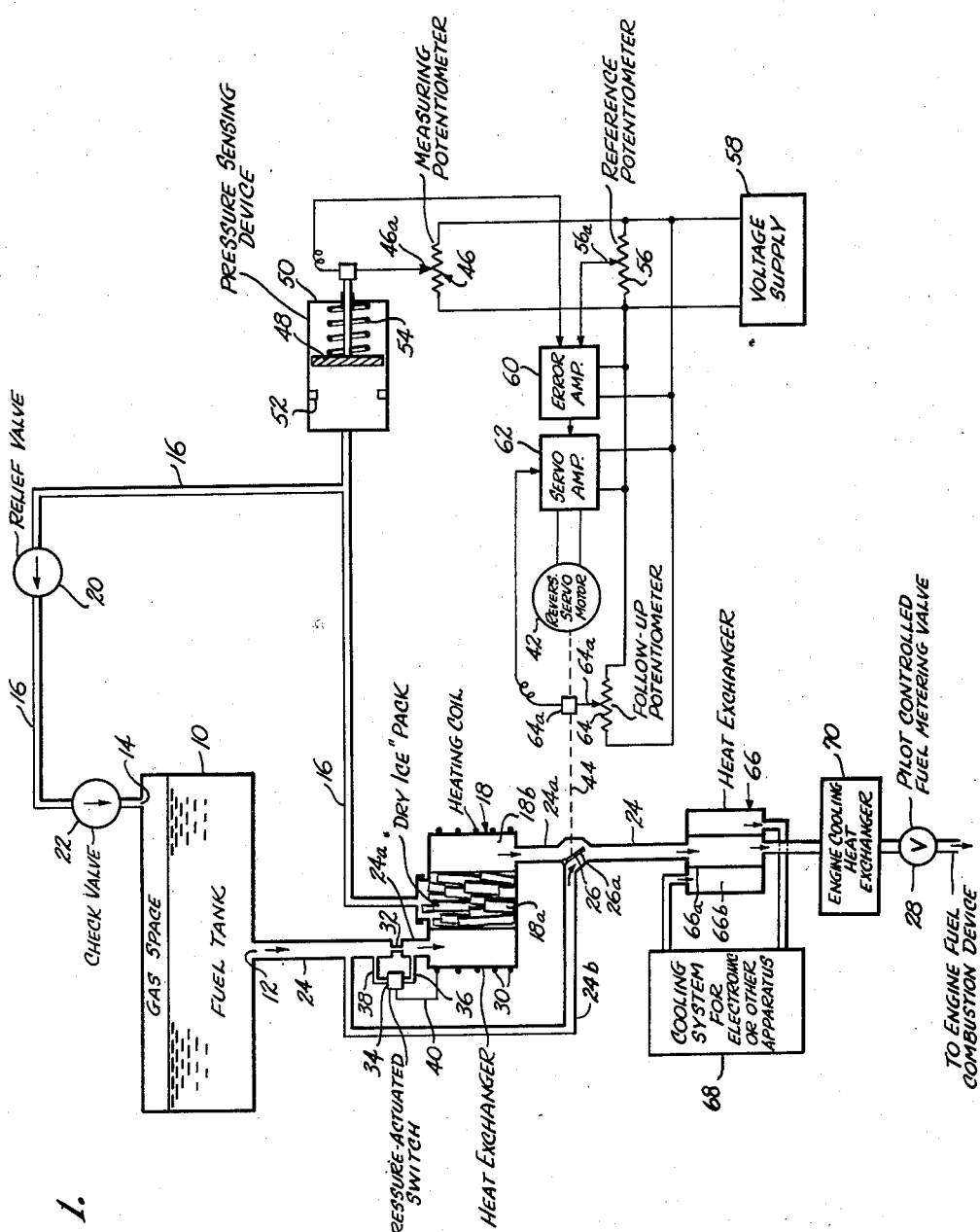
Figure 1 is a schematic diagram of one form of the novel fuel pumping and apparatus cooling system of the invention.

Referring to Figure 1, the fuel tank 10 has a fuel outlet 12 in the bottom and a gas inlet 14 in the top. Inert gas under pressure is delivered to the gas space at the top of the tank 10 through the inlet 14 through a conduit 16 from the compartment 18a of heat exchanger 18. The compartment 18a constitutes a container or reservoir of condensed, preferably solidified inert gas, preferably carbon dioxide or Dry Ice. A relief valve 20, venting to atmosphere, is interposed in the tank or in the conduit 16 to prevent gas pressure from rising excessively. A check valve 22 is also interposed in the conduit 16 adjacent the fuel tank gas inlet 14 to prevent fuel from entering the conduit while permitting gas to flow into the tank.

The heat exchanger 18 has a second compartment 18b situated in heat exchange relation to the compartment 18a containing the Dry Ice pack. Fuel forced from the tank 10 by pressure of inert gas therein is conducted through the conduit 24 to the combustion apparatus of the engine. This conduit divides into two branches, 24a and 24b.

The second compartment 18b of heat exchanger 18 is interposed in the conduit branch 24a. The conduit branch 24b serves effectively as a by-pass around the heat exchanger 18. The relative proportion of fuel flowing through the respective branches 24a and 24b is subject to control by a valve 26 situated in the junction where the branches rejoin. In one extreme position of the valve 26 little or no flow is permitted through the exchanger compartment 18b, whereas in the opposite extreme position of such valve little or no flow is permitted through the branch 24b. Total flow in the conduit 24 is subject to control by the fuel metering valve 28 situated in the conduit 24, and by any other desired flow regulating apparatus which may or may not be incorporated in the over-all system, such as automatic apparatus (not shown) for regulating combustion mixture in the engine or for maintaining a predetermined set speed, etc.

The valve 26 cannot completely cut off flow through the branch 24a because of a suitable aperture 26a in the valve permitting some flow through the conduit 24a even in the event of full closure positioning of the valve with respect to such conduit branch. Thus as long as the engine is operating and is drawing fuel from the fuel tank there will be some flow through the heat exchanger compartment 18b. The minimum rate of flow which can take place through the heat exchanger compartment 18b under operating conditions when the engine is drawing fuel is always sufficient to preclude any possibility of the fuel becoming frozen in the heat exchanger because of the presence of Dry Ice in the compartment 18a.

Should the fuel metering valve 28 be closed completely the stoppage of flow through the compartment 18b could cause fuel in the compartment to freeze, thereby rendering the system subsequently inoperative. In order to avoid this possibility, a heating coil 30 surrounds the heat exchanger compartment 18b and is energized automatically in response to a reduction of total flow through the conduit branch 24a to a value below a predetermined minimum. The condition of flow reduction necessary to operate the heater 30 is detected by placing a resistance 32 in the conduit branch 24a. The drop of pressure across this resistance element caused by flow through the conduit is applied to a suitable pressure-actuated switch 34 through the tap conduits 36 and 38 communicating with the conduit 24a at locations respectively immediately adjacent the upstream and the downstream sides of the resistance element 32. When this pressure differential drops below a predetermined value the pressure-actuated switch responds, closing an electrical circuit (not shown) to energize heater 30 through the electrical connection 40, as shown. The amount of heat supplied to compartment 30 is slight and has little effect on the rate of evaporation of Dry Ice in compartment 18a.

Pressure of inert gas delivered through conduit 16 to the fuel tank 10 is controlled by varying the rate of flow of fuel through the heat exchanger compartment 18b. For this purpose the valve 26 is moved back and forth in its operating range as necessary by a reversible servomotor 42 and mechanical connection 44. Variable positioning of the valve 26 does not appreciably alter the total flow through the conduit 24 inasmuch as the relative sizes of the conduit branches 24a and 24b are such in relation to the effect of repositioning of the valve that any decrease in flow through the branch 24a is accompanied by a corresponding increase in flow through the branch 24b and vice versa. Gas pressure in the conduit 16 is represented by the instantaneous position of the wiper 46a of potentiometer 46. Such wiper is positioned by a suitable pressure sensing device such as the piston 48 in cylinder 50 having stops 52 against which the piston is normally pressed by the spring 54. The spring acts on the piston oppositely to the effect of gas pressure in the cylinder, which is the pressure in the conduit 16. When the pressure in the conduit 16 is at or near the regulated value the piston 48 occupies an intermediate position between its limits of travel. The regulated pressure is established by the setting of the wiper 56a of reference potentiometer 56. If the gas pressure differs from the desired or regulated value, the wipers 46a and 56a will be at different electric potentials even though their windings are connected across the same voltage supply 58, and the resulting potential difference, applied to error amplifier 60, is amplified and applied to the servo amplifier 62 in order to operate the servomotor. If the pressure in conduit 16 is below the regulated value established by the setting of the reference potentiometer wiper, the servomotor is operated to progressively open the branch 24a and permit a greater rate of evaporation of inert gas from the Dry Ice pack. Conversely, the servomotor is operated in the reverse sense if the gas pressure is above the regulated value. Initially, with the piston 48 against stop 52, the error signal developed by the difference of potential between wipers 46a and 56a is such that the valve 26 opens branch 24a to permit a maximum flow through the branch.

For reasons of stability and accuracy of control the servomechanism used to regulate pressure by positioning of valve 26 is of the proportional control type whereby in corrective movement of the valve 26 is approximately proportional to the error signal developed. In the illustrated case this involves the provision of a follow-up potentiometer 64 having a wiper 64a which is mechanically connected to the coupling 44 so that the wiper 64a is positioned in accordance with the positioning of the valve 26. Thus whenever an error signal is applied to the servo amplifier to operate the servomotor for repositioning the valve 26, there is a feedback signal derived from the wiper 64a which progressively opposes the error signal applied to the servo amplifier 62 and finally cancels out such error signal as the wiper 64a reaches the position corresponding to the corrected position of the valve 26. Such servo techniques are generally understood in the art and require no detailed explanation herein.

In some situations the quantity of solidified inert gas stored in the container 18a will remain ample for producing the desired regulated gas pressure in conduit 16 throughout an entire trip. However, in certain other situations it is not a serious disadvantage that the pressure of gas in the conduit 16, should drop somewhat from its initial regulated value because of depletion of the quantity of Dry Ice in the compartment 18a, since in the final phases of some aircraft trips less fuel pressure is required to satisfy the demands of the engine than during the initial phases. For example, during take-off and climb of a bomber aircraft great quantities of fuel are required and the pressure in conduit 16 must be high for adequate pumping rates. However, as the airplane is returning for a landing with reduced weight load the fuel consumption rate will be less and can be gained with reduced pressure in gas conduit 16. Thus in the event the quantity of Dry Ice stored initially in the compartment 18a is held at a calculated minimum for purposes of a particular trip, thereby to increase the pay load, the function of the pressure-controlled servomechanism operating the valve 26 during the final phases of the trip may be to keep the pressure in conduit 16 as high as possible although it cannot attain its initial, regulated value.

In addition to the simplified arrangement for developing and regulating inert gas pressure for the purpose of feeding fuel from the fuel tank to the engine and of pressurizing the fuel tank with inert gas against the danger of explosions, there are other advantages to be derived from the arrangement disclosed. In the example a heat exchanger 66 is interposed in the conduit 24 between the branched portion thereof and the engine fuel combustion device, and the fuel is caused to flow through one compartment 66a of this heat exchanger. The other compartment, 66b constitutes part of a cooling system 68 for electronic or other apparatus requiring cooling. Thus, the fuel cooled by its flow through the first heat exchanger 18 serves as an effective coolant for a heat exchanger by which electronic or other apparatus of the airplane is cooled to safe operating temperatures. If desired, the fuel may be circulated through a heat exchanger constituting a part of the engine cooling system, as indicated at 70. The useful energy initially extracted from the fuel in the heat exchanger 18 in order to evaporate the inert gas for forcing the fuel through the system is therefore advantageously utilized for effecting cooling of various apparatus and components in the vehicle which otherwise would require mechanical or other cooling devices consuming energy and taking up space and adding weight.

Figure 2:
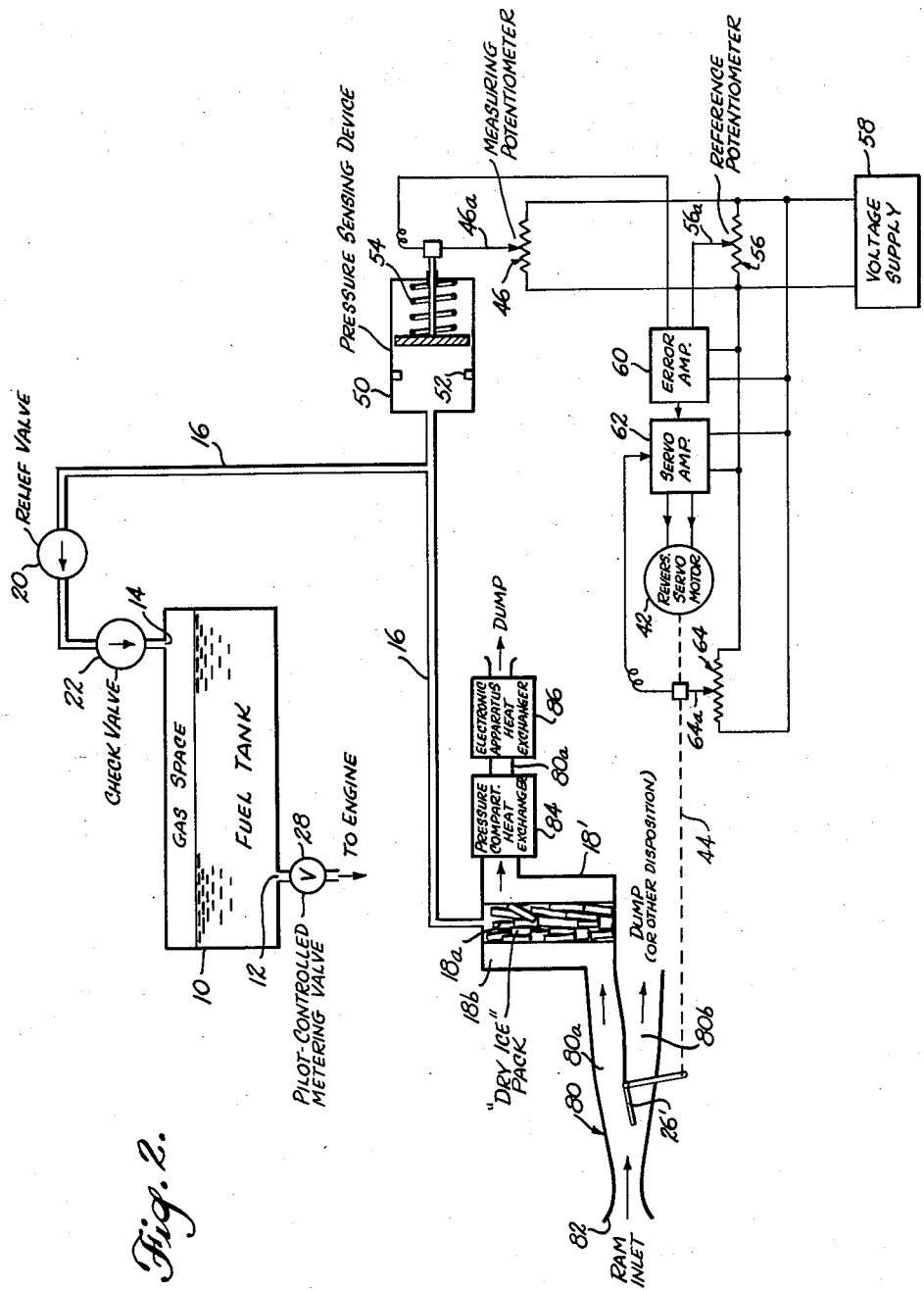
Figure 2 is a schematic diagram of a modified form of the novel system.

Referring to the modification shown in Figure 2, certain parts and components bear reference numerals similar to those applied to the corresponding parts and components in Figure 1 and therefore will not be described again. This applies particularly to the fuel tank and connections and to the pressure responsive servomechanism for regulating inert gas pressure in conduit 16. In this modified embodiment, fuel delivered from the fuel tank 10 may or may not be used as a coolant. In the diagram, the fuel is not passed into heat exchange relationship with the Dry Ice pack in the heat exchanger 18'. Instead heat of evaporation for the Dry Ice is extracted from ram air, which, after cooling in the heat exchanger 18' is itself used as a coolant.

The heat exchanger 18' has one compartment 18a containing the supply of solidified inert gas which is volatilized in order to deliver inert gas under pressure to the conduit 16 leading to the fuel tank. A second heat exchanger compartment 18b in heat exchange relationship with the compartment 18a is traversed by a suitable fluid medium, in this case air collected in the ram inlet 82 and conducted through the split conduit 80. One branch, 80a, of this conduit conducts ram air through the heat exchanger compartment 18b. The other branch, 80b, dumps the excess ram air overboard or conducts it to some other point of disposition where it may be usefully employed. The valve 26' is mounted at the entrance to the branches 80a and 80b to control the proportional amounts of air permitted to flow through these branches. In one extreme position of this valve a minimum flow of air is permitted through the branch 80b and a maximum through the branch 80a, whereas in the opposite extreme position the flow ratio is the inverse. Positioning of the valve 26' is under control of the servomotor 42, which in turn responds to the dictates of the inert gas pressure sensing device as in the preceding example.

Ram air cooled by passage through heat exchanger 18' may be used as a coolant for different purposes. In the example it serves as a coolant for a pressure compartment heat exchanger 84 such as may be used in the case of pressurized aircraft. Air discharging from the heat exchanger 84 may then be admitted to a second heat exchanger 86, such as for purposes of cooling electronic apparatus.

The foregoing and other modifications of the invention will be evident to those skilled in the art. Again it is to be noted that the terms "solidified" and "solid" or like terms applied to the inert gas stored in or supplied to a heat exchanger as and for the purposes herein disclosed embrace both the true solid and also the liquid states of such gas, and that the inventive features relating thereto are defined in the appended claims on that basis.

We claim as our invention:

1. In a liquid fuel feeding and apparatus cooling system, the combination comprising a liquid fuel storage container having a fuel outlet and a gas inlet, fuel conduit means connected to said fuel outlet for delivery of fuel from said tank to a fuel combustion device, heat exchange means having a first compartment interposed in said fuel conduit for passage of liquid fuel therethrough, and having a second compartment in heat exchange relationship with said first compartment, said second compartment containing a quantity of condensed inert gas volatilizable by heat extracted from the fuel flowing through said first compartment, gas conduit means conducting inert gas from said second compartment to said fuel storage container gas inlet for forcing liquid fuel from said container under pressure determined by pressure in said second compartment, whereby the feeding of liquid fuel from said container may be produced continuously by heat energy contained in the fuel itself, apparatus to be cooled and heat exchange means adapted for cooling such latter apparatus, said latter heat exchange means including a coolant compartment connected to said fuel conduit means for traversal by cooled liquid fuel issuing from the first heat exchange means.

2. In a liquid fuel feeding and apparatus cooling system, the combination comprising a liquid fuel storage container having a fuel outlet and a gas inlet, fuel conduit means connected to said fuel outlet for delivery of fuel from said tank to a fuel combustion device, heat exchange means having a first compartment interposed in said fuel conduit for passage of liquid fuel therethrough, and having a second compartment in heat exchange relationship with said first compartment, said second compartment containing a quantity of condensed inert gas volatilizable by heat extracted from the fuel flowing through said first compartment, gas conduit means conducting inert gas from said second compartment to said fuel storage container gas inlet for forcing liquid fuel from said container under pressure determined by pressure in said second compartment, whereby the feeding of liquid fuel from said container may be produced continuously by heat energy contained in the fuel itself, apparatus to be cooled, heat exchange means adapted for cooling such latter apparatus, said latter heat exchange means including a coolant compartment connected to said fuel conduit means for traversal by cooled liquid fuel issuing from the first heat exchange means, said liquid fuel conduit being branched and the first compartment of the first-mentioned heat exchange means being interposed in one of the branches, valve means in said fuel conduit means operable to adjust the relative rates of flow of liquid fuel through the respective conduit branches, and valve operating means connected to said valve means and arranged to be responsive to pressure of inert gas delivered to the fuel storage container for automatically increasing relative flow of fuel through the heat exchange means conduit branch by a decrease of such inert gas pressure, and decreasing such relative flow by an increase of such pressure, thereby to regulate pressure of fuel delivered to the combustion device.

3. In a liquid feeding system, the combination comprising a liquid storage container having a liquid outlet and a gas inlet, liquid conduit means connected to said outlet for delivery of liquid from said tank to a liquid utilization device, heat exchange means having a first compartment interposed in said liquid conduit for passage of liquid therethrough, and having a second compartment in heat exchange relationship with said first compartment, said second compartment containing a quantity of condensed inert gas volatilizable by heat extracted from the liquid flowing through said first compartment, gas conduit means conducting inert gas from said second compartment to said storage container gas inlet for forcing liquid from said container under pressure determined by pressure in said second compartment, whereby the feeding of liquid from said container may be produced continuously by heat energy contained in the liquid itself, said liquid conduit being branched and the first compartment of the first-mentioned heat exchange means being interposed in one of the branches, valve means in said latter conduit means operable to adjust the relative rates of flow of liquid through the respective conduit branches, and valve operating means connected to said valve means and arranged to be responsive to pressure of inert gas delivered to the storage container for automatically increasing relative flow of liquid through the heat exchange means conduit branch by a decrease of such inert gas pressure, and decreasing such relative flow by an increase of such pressure, thereby to regulate pressure of liquid delivered to the liquid utilization device.

4. In an aircraft having an engine, the combination comprising a liquid fuel storage container having a fuel outlet and a gas inlet, fuel conduit means connected to said fuel outlet for delivery of fuel to the aircraft engine, metering valve means interposed in said fuel conduit for varying the total rate of flow therethrough, said fuel conduit being branched, heat exchange means having a first compartment interposed in one branch of said conduit means for passage of liquid fuel therethrough, valve means operable for varying relative rates of flow through the respective conduit branches without materially changing total flow through said conduit means, said heat exchange means having a second compartment in heat exchange relation to the first compartment and containing a quantity of condensed inert gas volatilized by heat extracted from the liquid fuel flowing through the first compartment, conduit means connecting said heat exchanger second compartment with said fuel container gas inlet for delivering pressurized inert gas to said container for forcing fuel from said container and through said heat exchanger first compartment, and means operatively connected to said last mentioned valve means and arranged to be responsive to variations in pressure of inert gas for automatically operating said latter valve means to increase relative flow through said heat exchanger first compartment in response to a decrease of inert gas pressure and to decrease such relative flow in response to an increase of inert gas pressure, thereby to regulate pressure of fuel delivered to the aircraft engine.

5. In an aircraft having an engine, the combination comprising a liquid fuel storage container having a fuel outlet and a gas inlet, fuel conduit means connected to said fuel outlet for delivery of fuel to the aircraft engine, metering valve means interposed in said fuel conduit for varying the total rate of flow therethrough, said fuel conduit being branched, heat exchange means having a first compartment interposed in one branch of said conduit means for passage of liquid fuel therethrough, valve means operable for varying relative rates of flow through the respective conduit branches without materially changing total flow through said conduit means, said heat exchange means having a second compartment in heat exchange relation to the first compartment and containing a quantity of condensed inert gas volatilized by heat extracted from the liquid fuel flowing through the first compartment, conduit means connecting said heat exchanger second compartment with said fuel container gas inlet for delivering pressurized inert gas to said container for forcing fuel from said container and through said heat exchanger first compartment, means operatively connected to said valve means and arranged to be responsive to variations in pressure of inert gas for automatically operating said valve means to increase relative flow through said heat exchanger first compartment in response to a decrease of inert gas pressure and to decrease such relative flow in response to an increase of inert gas pressure, thereby to regulate pressure of fuel delivered to the aircraft engine, aircraft apparatus to be cooled and a second heat exchanger arranged for cooling of such aircraft apparatus and connected to said conduit means for traversal thereof by cooled liquid fuel from said first heat exchanger means.

6. The combination defined in claim 5, wherein the second heat exchanger comprises a heat exchanger arranged in engine-cooling relationship with the aircraft engine.

7. In an aircraft having an engine, the combination comprising a liquid fuel storage container having a fuel outlet and a gas inlet, fuel conduit means connected to said fuel outlet for delivery of fuel to the aircraft engine, heat exchange means having a first compartment, ram air collecting means on the aircraft arranged for passing ram air through said first compartment, valve means operable for varying rate of flow of ram air through said first compartment, said heat exchange means having a second compartment in heat exchange relation to the first compartment and containing a quantity of condensed inert gas volatilized by heat extracted from the ram air flowing through the first compartment, conduit means connecting said heat exchanger second compartment with said fuel container gas inlet for delivering pressurized inert gas to said container for forcing fuel from said container and to the engine, and means operatively connected to said valve means and arranged to be responsive to variations in pressure of inert gas for automatically operating said valve means to increase flow of ram air through said heat exchanger first compartment in response to a decrease of inert gas pressure and to decrease such flow in response to an increase of inert gas pressure, thereby to regulate pressure of fuel delivered to the aircraft engine.

8. In an aircraft having an engine, the combination comprising a liquid fuel storage container having a fuel outlet and a gas inlet, fuel conduit means connected to said fuel outlet for delivery of fuel to the aircraft engine, heat exchange means having a first compartment, ram air collecting means on the aircraft arranged for passing ram air through said first compartment, valve means operable for varying rate of flow of ram air through said first compartment, said heat exchange means having a second compartment in heat exchange relation to the first compartment and containing a quantity of condensed inert gas volatilized by heat extracted from the ram air flowing through the first compartment, conduit means connecting said heat exchanger second compartment with said fuel container gas inlet for delivering pressurized inert gas to said container for forcing fuel from said container and to the engine, means operatively connected to said valve means and arranged to be responsive to variations in pressure of inert gas for automatically operating said valve means to increase flow of ram air through said heat exchanger first compartment in response to a decrease of inert gas pressure and to decrease such flow in response to an increase of inert gas pressure, thereby to regulate pressure of fuel delivered to the aircraft engine, and a second heat exchanger arranged for cooling of aircraft apparatus and connected to the first compartment of said first heat exchange means to receive cooled ram air from said first heat exchange means as a coolant in said second heat exchanger.

9. In an aircraft having an engine, the combination comprising a liquid fuel storage container having a fuel outlet and a gas inlet, fuel conduit means connected to said fuel outlet for delivery of fuel to the aircraft engine, heat exchange means having a first compartment, fluid conduit means connected to said first compartment for delivery thereto of fluid to be cooled, said fluid conduit means having a branch which by-passes said first compartment, valve means in said fluid conduit means operable for varying relative rates of flow of such fluid into said first compartment and into said by-pass respectively without materially changing total flow of fluid through said fluid conduit means, said heat exchange means having a second compartment in heat exchange relation to the first compartment and containing a quantity of condensed inert gas volatilized by heat extracted from the fluid flowing into and through said first compartment, conduit means connecting said heat exchanger second compartment with said fuel container gas inlet for delivering pressurized inert gas to said container for forcing fuel from said container to the engine, and means operatively connected to said valve means and arranged to be responsive to variations in pressure of the inert gas delivered to said container for automatically operating said valve means to increase relative fluid flow through said first compartment in response to a decrease of inert gas pressure and to decrease such relative flow in response to an increase of inert gas pressure, thereby to regulate pressure of fuel delivered to the aircraft engine.

10. The combination defined in claim 9, and aircraft apparatus to be cooled, and a second heat exchanger arranged for cooling of such aircraft apparatus and having a heat exchange compartment therein connected to the first compartment of the first-mentioned heat exchanger to receive fluid traversing the same.

11. In a liquid fuel feeding system, the combination comprising a liquid fuel storage container means having a main storage compartment, a fuel outlet, a gas inlet, fuel conduit means connected to said fuel outlet for delivery of fuel from said tank to a fuel combustion device, heat exchange means having a compartment in heat exchange relationship with said storage container means, said heat exchange compartment containing a quantity of condensed inert gas volatilizable by heat extracted from the fuel in said storage container means, and gas conduit means conducting inert gas from said heat exchange compartment into said fuel storage container gas inlet to fill all the open space in said main storage compartment for forcing liquid therefrom under pressure determined by pressure in said heat exchange compartment, whereby the feeding of liquid fuel from said main storage compartment may be produced continuously by heat energy contained in the fuel itself, and whereby said main storage compartment is explosion-proofed by the inert gas, said liquid fuel conduit being branched and the heat exchange means further including a second compartment, interposed in one of the branches of such conduit for passage of liquid fuel therethrough, and valve means in said fuel conduit means operable to adjust the relative rates of flow of liquid fuel through the respective conduit branches, and valve operating means connected to said valve means and arranged to be responsive to pressure of inert gas delivered to the fuel storage container for automatically increasing relative flow of fuel through the heat exchange means conduit branch by decrease of such inert gas pressure, and decreasing such relative flow by an increase of such pressure, thereby to regulate pressure of fuel delivered to the combustion device.

References Cited in the file of this patent

UNITED STATES PATENTS

| | | |
|---|---|---|
| 1,936,848 | Masury | Nov. 28, 1933 |
| 2,501,611 | Nicholson | Mar. 21, 1950 |
| 2,543,362 | Getz | Feb. 27, 1951 |
| 2,620,107 | Tolan | Dec. 2, 1952 |
| 2,631,426 | Jewett | Mar. 17, 1953 |
| 2,697,483 | Stanley | Dec. 21, 1954 |
| 2,701,441 | Mitchell | Feb. 8, 1955 |
| 2,783,613 | Von Zborowski | Mar. 5, 1957 |

FOREIGN PATENTS

| | | |
|---|---|---|
| 529,635 | Great Britain | Nov. 26, 1940 |